United States Patent
Nakajima et al.

(10) Patent No.: US 6,606,026 B1
(45) Date of Patent: Aug. 12, 2003

(54) INFORMATION PROCESSING APPARATUS AND METHOD, AND DISTRIBUTION MEDIUM

(75) Inventors: Yasuhisa Nakajima, Kanagawa (JP); Tomoyuki Hanai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/338,704

(22) Filed: Jun. 23, 1999

(30) Foreign Application Priority Data

Jun. 25, 1998 (JP) .......................................... P10-178615

(51) Int. Cl.⁷ .............................. H04Q 5/22; G08B 5/22
(52) U.S. Cl. ................................ 340/10.51; 340/568.1; 340/572.1; 340/7.52; 340/7.55
(58) Field of Search ........................... 340/10.51, 568.1, 340/7.52, 7.53, 7.55, 572.1; 235/380, 381, 382, 384, 385

(56) References Cited

U.S. PATENT DOCUMENTS

| | | | | | |
|---|---|---|---|---|---|
| 4,246,573 A | * | 1/1981 | Kiss | ............................ | 340/539 |
| 4,639,726 A | * | 1/1987 | Ichikawa et al. | ............. | 455/38 |
| 5,461,428 A | * | 10/1995 | Yoo | ............................ | 348/558 |
| 5,631,698 A | * | 5/1997 | Lee | ............................ | 348/178 |
| 5,903,256 A | * | 5/1999 | Kim | ............................ | 345/157 |
| 6,043,814 A | * | 3/2000 | Lim | ............................ | 345/326 |
| 6,069,619 A | * | 5/2000 | Kim | ............................ | 345/211 |

* cited by examiner

Primary Examiner—Donnie L. Crosland
(74) Attorney, Agent, or Firm—Frommer Lawrence & Haug LLP; William S. Frommer; Bruno Polito

(57) ABSTRACT

In order to prevent meaningless data from being displayed when the data stored in the memory of tag cannot be displayed, the following is performed. When it is judged that matching of character set information intrinsic to the information processing apparatus and that stored in the tag is not attained, the read writer reads, from the tag, the alternative data different from the data to be displayed intrinsically, converts the data to the predetermined format and then supplies this data to the OSD section. The OSD section converts the data supplied to the data which can be displayed, causing the display section to display this data. Moreover, the read writer generates the warning display data suggesting that matching of character set information is not attained and then supplies this data to the OSD section. The OSD section causes the display section to additionally display the warning display data to the display image. Moreover, when the read writer supplies the signal suggesting mismatch of the character set information to the warning sound generating section, the warning sound generating section generates the warning sound and then outputs this sound through a speaker.

4 Claims, 9 Drawing Sheets

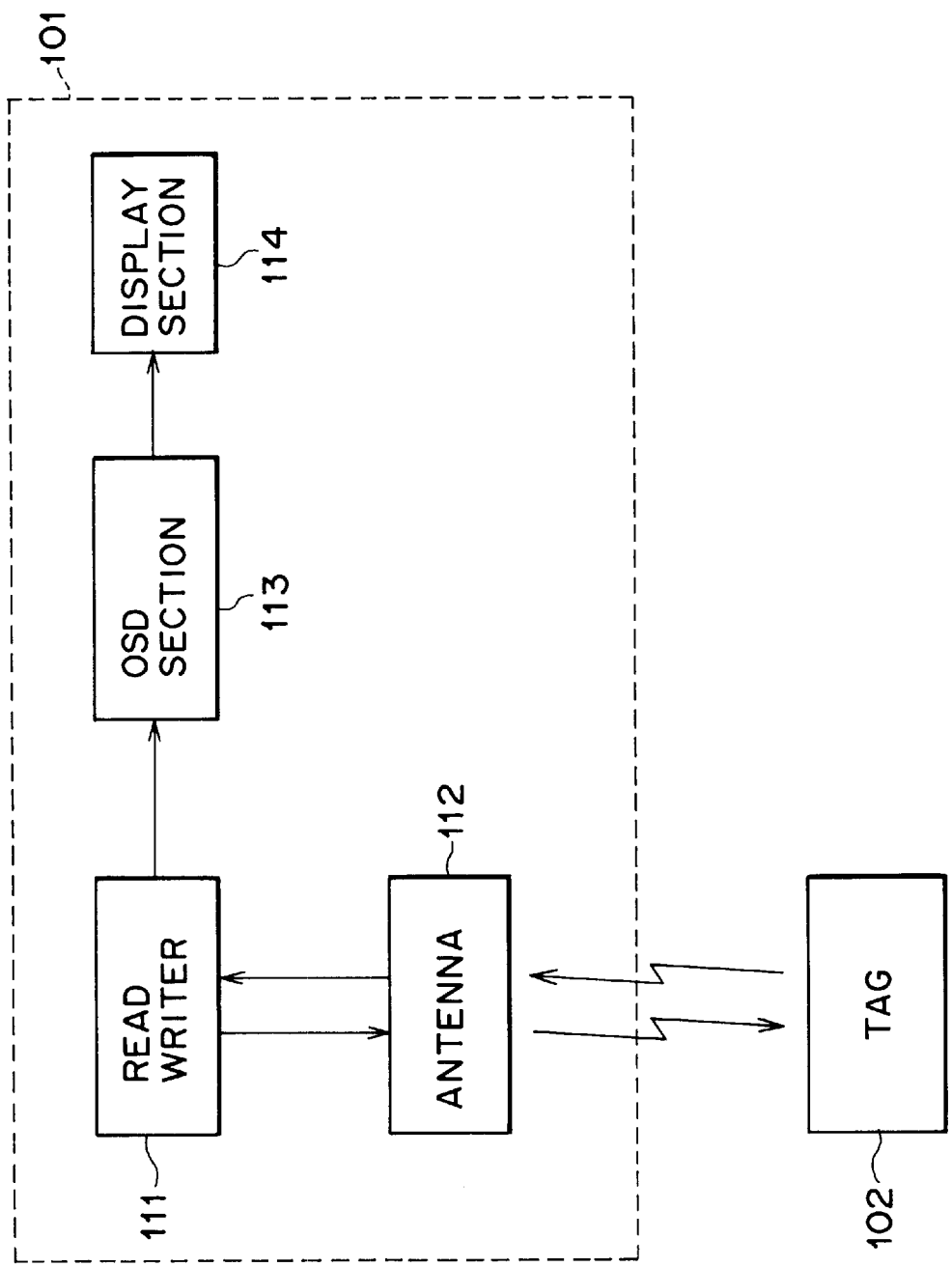

INFORMATION PROCESSING APPARATUS AND METHOD, AND DISTRIBUTION MEDIUM

BACKGROUND OF THE INVENTION

1. Field of the Invention

The present invention relates to an information processing apparatus and method and a distribution medium and particularly to an information processing apparatus and method and a distribution medium which can read and display the alternative data different from the data to be intrinsically displayed when the data read from a tag comprising a non-contact type memory cannot be displayed normally.

2. Description of Related Art

Recently, an information processing apparatus which is accessible to a tag comprising a non-contact type memory (hereinafter referred to only as tag) is spreading widely. FIG. 10 illustrates a block diagram of an information processing apparatus of the related art which is accessible to tag. In FIG. 10, when a storage medium (video cassette, for example) on which a tag 102 is adhered is loaded or placed nearer in the predetermined distance to an information processing apparatus 101, a read writer 111 reads data of the predetermined address (area) of the memory comprised in the tag 102 via an antenna 112. The data read from the memory is then converted to the predetermined format by the read writer 111 and is then supplied to OSD (On Screen Display) section 113. The OSD section 113 converts the data supplied from the read writer 111 to the data which can be displayed by the display section 114.

FIG. 11 illustrates a data format of tag 102. The address in the horizontal direction is structured by 16 bytes 8from address 0 to address 15). As shown in FIG. 11, data of tag 102 is structured by memory management information area 121, media information area 122 and program information area 123. Depending on the data area, character code is stored (for example, character code 124 of the program information area 123) in order to designate the characters to be displayed on the display section 114.

Moreover, a program title is written as the data suggesting recorded content in the predetermined area of the program information area 123. This title is expressed, in the case of English, by the character code defined by one byte but expressed, in the case of Japanese, by the character code of defined by two bytes.

However, when the tag 102 for storing data expressed by the character code defined by two bytes (for example, Japanese) is loaded or placed nearer to the information processing apparatus of the related art supporting only the character code defined by one byte (for example, English), there rises a problem that the display section 114 does not display data or displays, if it is realized, quite different characters (illegal characters).

SUMMARY OF THE INVENTION

Considering such background, the present invention has been proposed. Namely, if the information processing apparatus cannot display the data read from a tag, it can display alternative data different from the data to be intrinsically displayed. Moreover, the information processing apparatus can display such situation. Moreover, the apparatus notifies the condition that display is impossible, using a warning sound.

An information processing apparatus according to a first embodiment of the invention corresponds to the information processing apparatus accessible to a non-contact type storage device comprising judging means for judging whether data being stored in the storage device can be displayed or not; reading means for reading alternative data from the storage device when the data is judged not to be displayed by the judging means; converting means for converting the alternative data read by the reading means to the data to be displayed; and display controlling means for making control to display the data converted by the converting means.

An information processing method according to a second embodiment of the invention corresponds to the information processing method of an information processing apparatus accessible to a non-contact type storage device, comprising judging step for judging whether data being stored in the storage device can be displayed or not; reading step for reading alternative data from the storage device when the data is judged not to be displayed in the judging step; converting step for converting the alternative data read in the reading step to the data to be displayed; and display controlling step for making control to display the data converted in the converting step.

A distribution medium according to the invention corresponds to the distribution medium providing a program for causing an information processing apparatus accessible to a non-contact type storage device to execute the processes including judging step for judging whether data being stored in the storage device can be displayed or not; reading step for reading alternative data from the storage device when the data is judged not to be displayed by the judging step; converting step for converting the alternative data read in the reading step to the data to be displayed; and display controlling step for making control to display the data converted in the converting step.

In the information processing apparatus of the first embodiment, the judging means judges whether data stored in the storage device can be displayed or not and the reading means reads, when the judging means judges that data cannot be displayed, the alternative data from the storage device, the converting means converts the alternative data read by the reading means to the data to be displayed and the display controlling means controls to display the data converted by the converting means.

In the information processing method of the second embodiment and the program provided on a distribution medium according to the invention, it is judged in the judging means that the data stored in the storage device can be displayed or not, alternative data is read in the reading step when it is judged that data cannot be displayed in the judging step, the alternative data read by the reading step is converted to the data to be displayed in the converting step and the data converted in the converting step is controlled to be displayed in the display controlling step.

BRIEF DESCRIPTION OF THE DRAWINGS

FIG. 10 is a block diagram illustrating an example of structure of the information processing apparatus of the related art.

DETAILED DESCRIPTION OF THE PREFERRED EMBODIMENTS

The preferred embodiment of the present invention will be explained. In this case, the characteristic of the present invention is described as follow, in order to make clear the correspondence between each means of the invention described in the claims and the following preferred embodiment by adding the corresponding embodiment (only an example) within the parentheses after each means. Of course, however, this description does not limit each means.

Namely, the information processing apparatus claimed in claim 1 corresponds to an information processing apparatus accessible to a non-contact type storage device comprising a judging means (for example, step S3 of FIG. 8) for judging whether the data stored in the storage device can be displayed or not, a reading means (for example, step S5 in FIG. 8) for reading the alternative data from the storage device when it is judged by the judging means that data cannot be displayed, a converting means (for example, step S6 in FIG. 8) for converting the alternative data read by the reading means to the data to be displayed and a display controlling means (for example, OSD section 13 in FIG. 1) for controlling to display the data converted by the converting means.

The information processing apparatus claimed in claim 2 is characterized by further comprising an inserting means (for example, step S7 in FIG. 8) for inserting the warning data suggesting disabled data display to the display data controlled to display by the display controlling means when it is judged by the judging means that data cannot be displayed.

The information processing apparatus claimed in claim 3 further comprises a warning sound generating means (for example, a warning sound generating section 15 in FIG. 1) for generating a warning sound suggesting disabled data display when it is judged by the judging means that data cannot be displayed.

Figure 1:
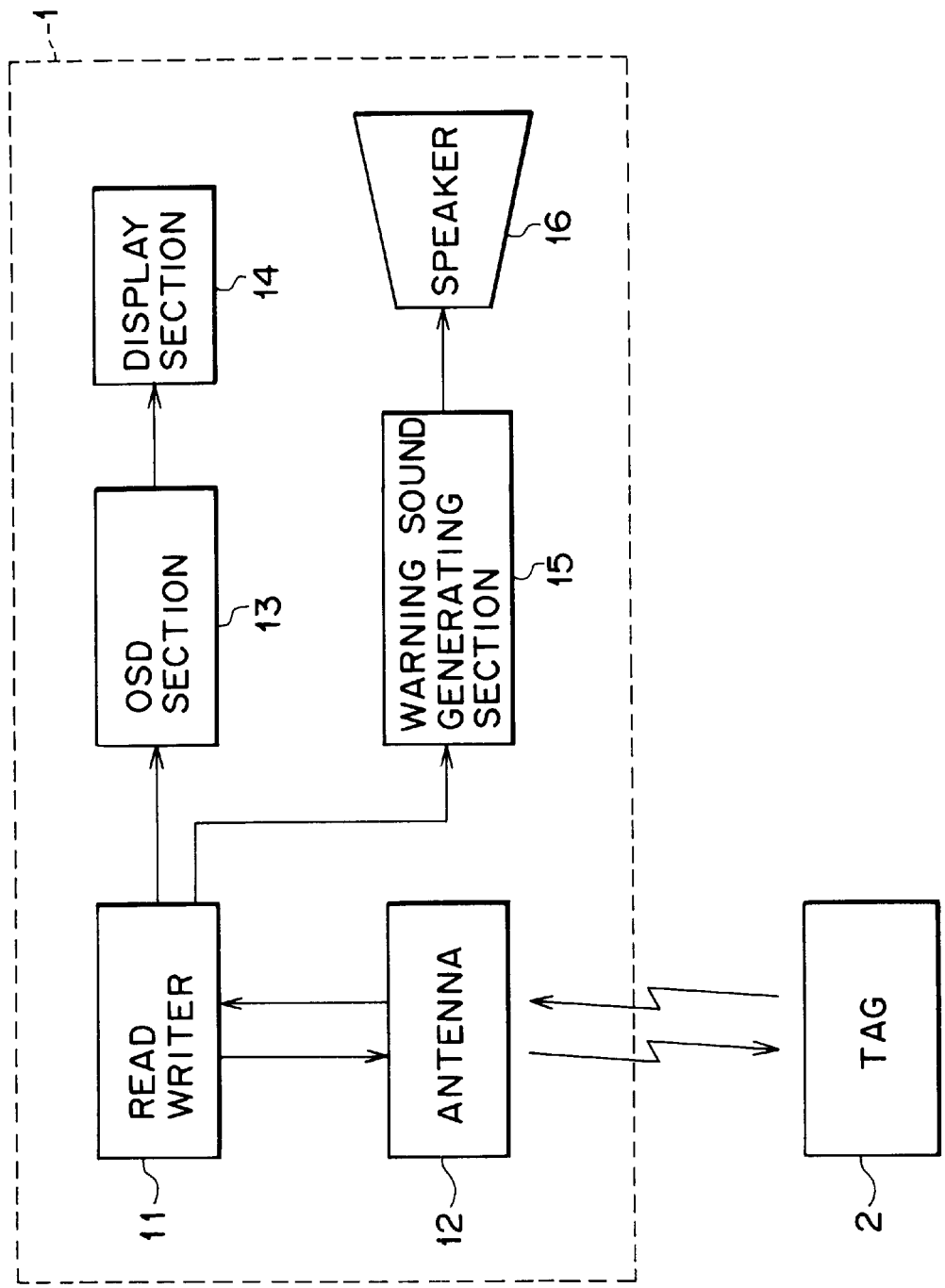
FIG. 1 is a block diagram illustrating a structure of an embodiment of the information processing apparatus of the present information.

FIG. 1 is a block diagram illustrating a structure of a preferred embodiment of the information processing apparatus of the present invention. In this preferred embodiment, when a video cassette (not illustrated) on which a tag 2 is adhered is loaded or placed nearer in the predetermined distance to the information processing apparatus 1, a read writer 11 reads the character set information of tag 2 via an antenna 12. Here, the read writer 11 judges whether the character set information of tag 2 is matched or not with the intrinsic character set information of the information processing apparatus 1 stored in a memory (not illustrated) within the read writer 11.

When it is judged that the character set information is matched, the read writer 11 converts the data read from the tag 2 to the predetermined format and then supplies the data to OSD section 13. The OSD section 13 converts the data supplied from the read writer 11 to the data to be displayed, causing the display section 14 to display the same data.

When the character set information is judged not to be matched, the read writer 1 reads the alternative data different from the data to be displayed intrinsically from the tag 2. The read writer 11 converts the alternative data read from the tag 2 to the predetermined format and then supplies this alternative data to the OSD section 13. The OSD section 13 converts the data supplied from the read writer 11 to the data to be displayed, causing the display section 14 to display the same data.

Moreover, the read writer 11 generates a warning display data suggesting that the character set information is not matched and then supplies this data to the OSD section 13. The OSD section 13 causes the display section 14 to additionally display the supplied warning display data on the display screen.

Moreover, the read writer 11 supplies the signal suggesting that the character set information does not match to the warning sound generating section 15. When the signal suggesting that the character set information does not match is supplied to the warning sound generating section 15, the warning sound generating section 15 generates the warning sound to be output from a speaker 16.

Figure 2:
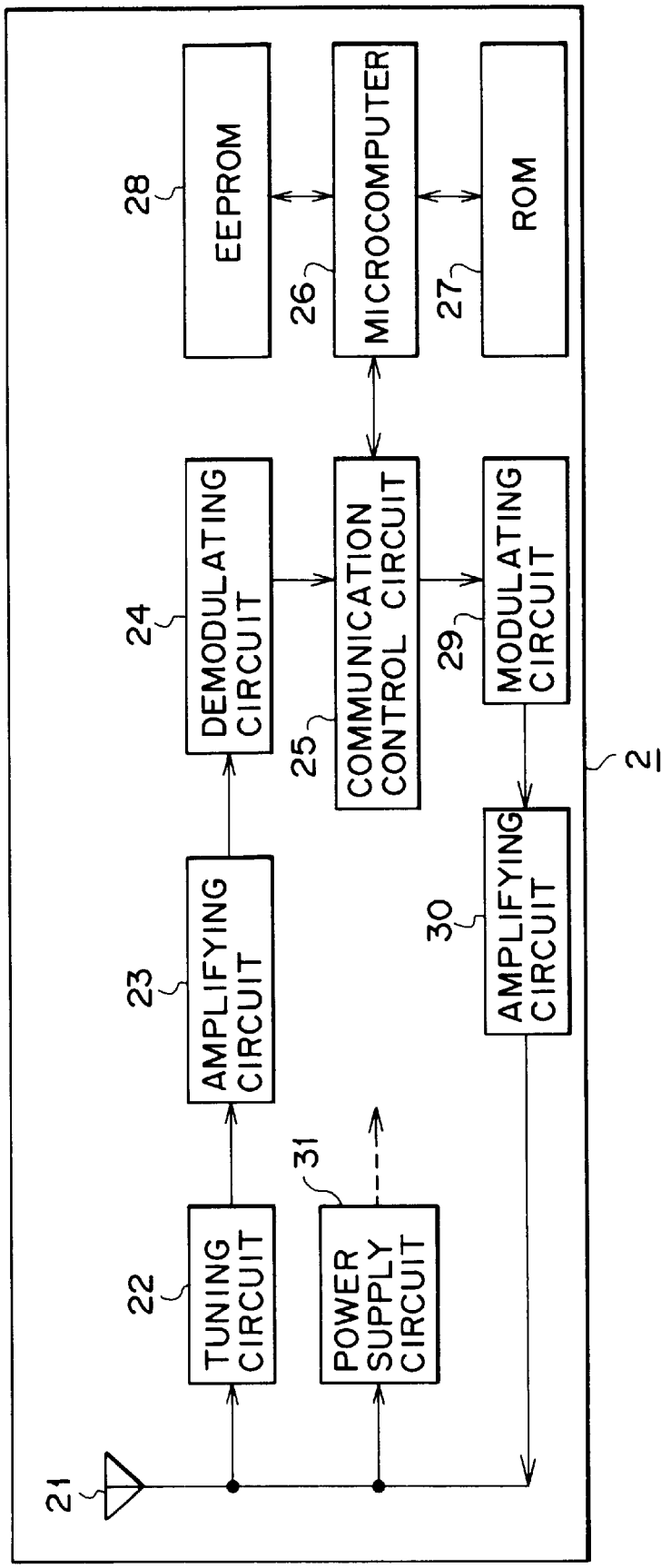
FIG. 2 is a block diagram illustrating an example of structure of the tag 2.

FIG. 2 is a block diagram illustrating an example of structure of tag 2. An antenna 21 forming the tag 2 receives the signal wave from the read writer 11 explained later and supplies the signal corresponding to the received signal to a tuning circuit 22 and a power supply circuit 31. The tuning circuit 22 extracts the carrier frequency used for communication between the tag 2 and read writer 11 from the signal supplied from the antenna 21.

An amplifying circuit 23 amplifies the input signal up to the predetermined level and then outputs the same signal. A demodulating circuit 24 demodulates the signal modulated to the carrier frequency to convert to the corresponding predetermined data. A communication control circuit 25 is designed to switch the transmission and reception of the data. A microcomputer 26 controls each section depending on the control program stored in ROM (Read Only Memory) 27. Moreover, the microcomputer 26 also supplies the data required to be stored among those supplied via the communication control circuit 25 to EEPROM (Electrically Erasable and Programmable Read Only Memory) 28.

EEPROM 28 stores the data supplied from the microcomputer 26. A modulating circuit 29 modulates the data supplied from the communication control circuit 25 to the signal of carrier frequency and then outputs the same signal. An amplifying circuit 30 amplifies the signal supplied from the modulating circuit 29 and modulated to the carrier frequency up to the level required for communication. The antenna 21 transmits the signal of carrier frequency amplified by the amplifying circuit 30 by using the carrier.

Figure 3:
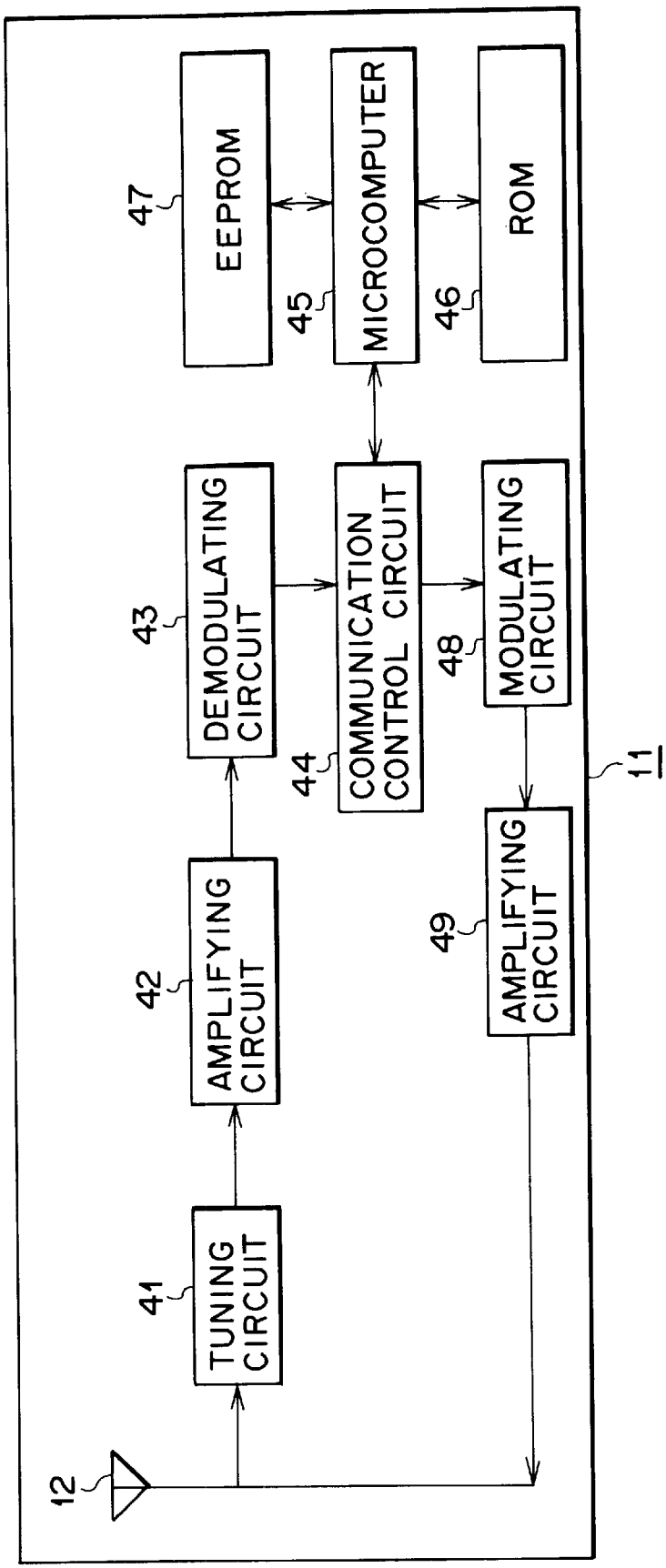
FIG. 3 is a block diagram illustrating an example of structure of read writer 11.

FIG. 3 is a block diagram illustrating an example of structure of read writer 11. An antenna 12 transmits the predetermined signal to the tag 2 and also transmits and receives the predetermined carrier for communication with the tag 2. Moreover, the antenna 12 also generates magnetic field to supply the power source to the tag 2.

The tuning circuit 41 extracts the carrier frequency to be used for communication between the tag 2 and read writer 11 from the signal supplied from the antenna 12. The amplifying circuit 42 amplifies the input signal up to the predetermined level and then outputs the same signal. The demodulating circuit 43 demodulates the signal modulated to the carrier frequency and then converts the same signal to the predetermined data. The communication control circuit 44 switches the transmission and reception of data and also controls the communication. The microcomputer 45 controls each section depending on the control program stored in ROM 46. Moreover, the microcomputer 45 supplies, to RAM (Random Access Memory) 47, as required the data required to be stored among those supplied through the communication control circuit 44.

RAM 47 can store the data supplied from the microcomputer 45. The modulating circuit 48 modulates the data supplied from the communication control circuit 44 to the signal of carrier frequency to output it. The amplifying circuit 49 amplifies the signal modulated to the carrier frequency supplied from the modulating circuit 48 to the level required for communication. The antenna 12 transmits the signal of carrier frequency amplified by the amplifying circuit 49 with the carrier.

As explained above, data transmission and reception are executed between the tag 2 and read writer 11.

Figure 4:
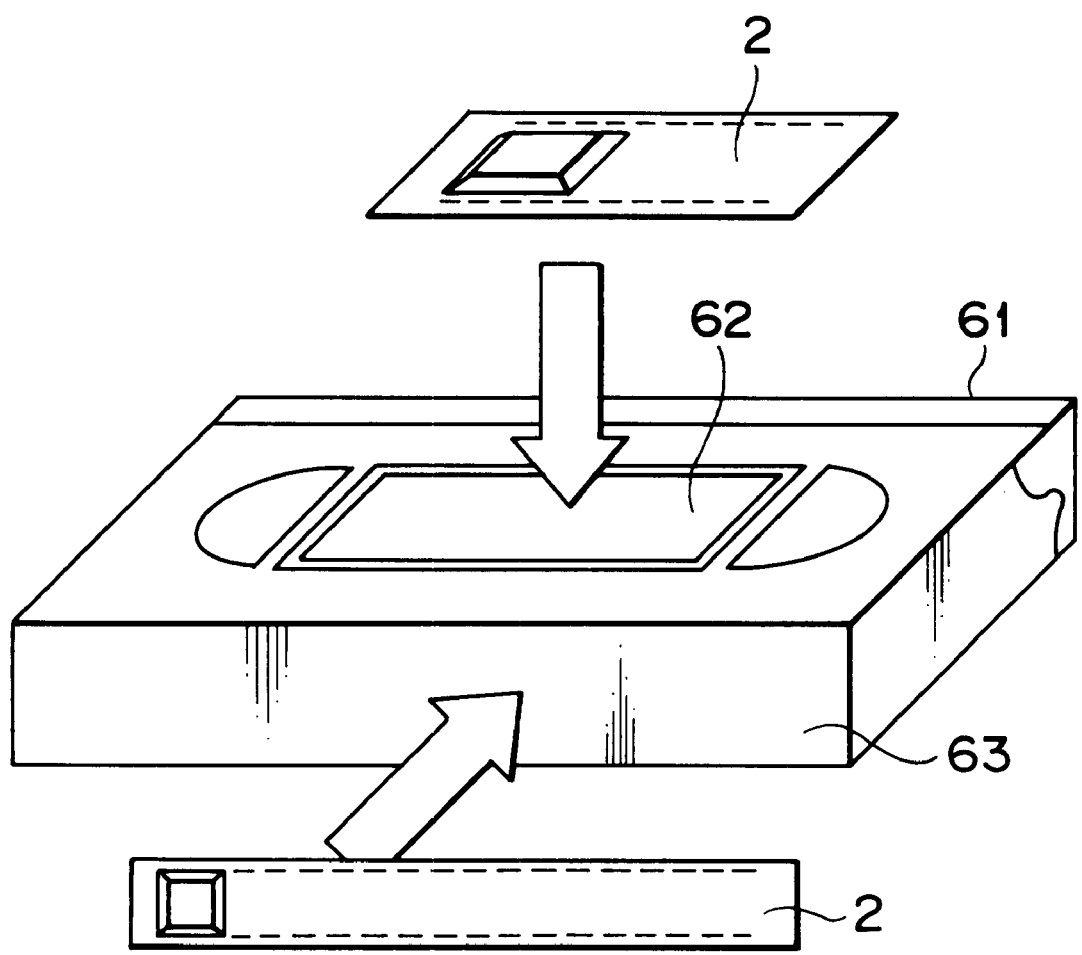
FIG. 4 is a diagram illustrating a loading example of tag 2 to a video cassette.

FIG. 4 illustrates an example of loading of the tag 2 illustrated in FIG. 1 to a video cassette 61. The tag 2 is loaded to any one of the recessed areas 62, 63 provided on the housing of the video cassette 61.

Figure 5:
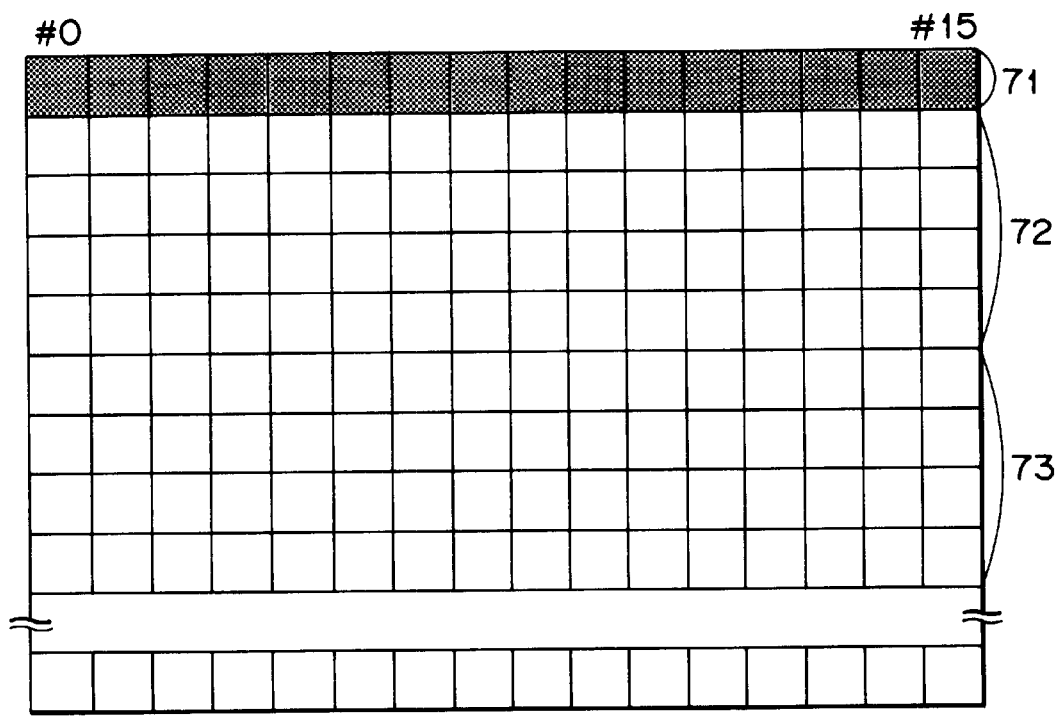
FIG. 5 is a diagram for explaining a data format of memory in the tag 2.

FIG. 5 illustrates a data format of the memory (EEPROM 28) of the tag 2. As illustrated in FIG. 5, the storage area of tag 2 is formed of the memory management information area 71, media information area 72 and program information area 73. The intrinsic information of the video cassette 61 is stored in the memory management information area 71 and media information area 72. In these areas, category information (for private use, for business use) depending on the application field of video cassette 61 and information regarding memory capacity, etc. are recorded. In the program information area 73, information regarding the television broadcast system such as NTSC, PAL or the like, program category information and program title, etc. are stored.

Figure 6:
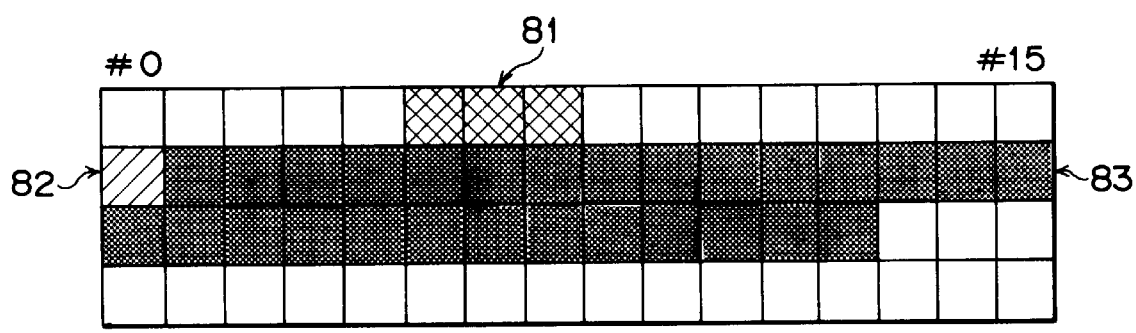
FIG. 6 is a diagram for explaining the data structure of the media information area 72 in FIG. 5.

FIG. 6 is illustrated for explaining the media information area 72 of FIG. 5. In this area, an alternative data 81 (3 bytes) displayed in place of the data to be intrinsically displayed is stored when the data read by the information processing apparatus 1 cannot be displayed. Moreover, the character code 82 of one byte indicating the characters used in the subsequent title 83 is also stored in this area. In addition, the media information (title 83) of 28 bytes is also stored.

Figure 7:
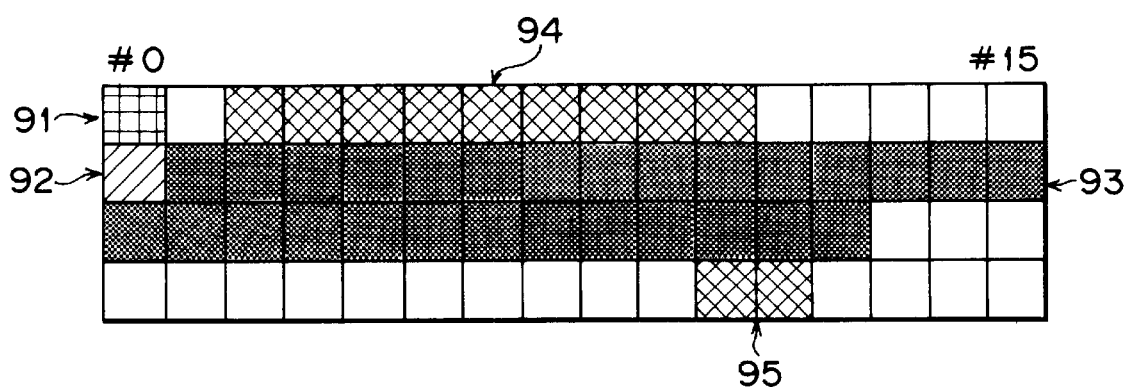
FIG. 7 is a diagram for explaining the data structure of the program information area 73 in FIG. 5.
Figure 11:
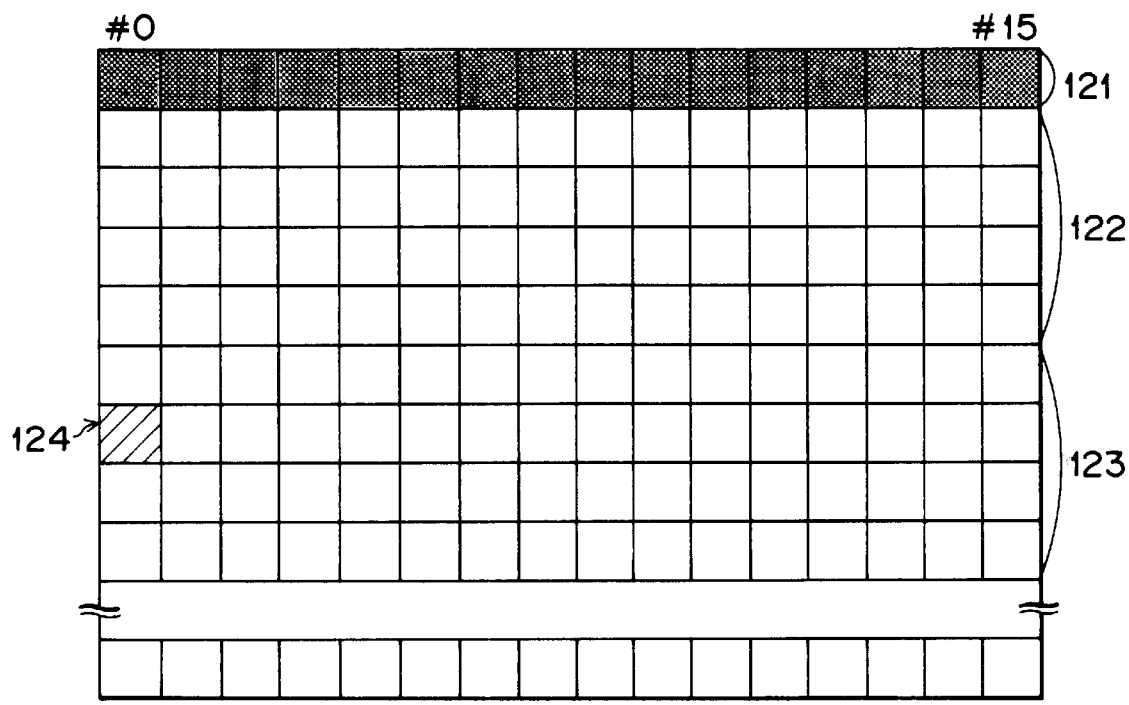
FIG. 11 is a diagram for explaining a data format of memory in the tag 102.

FIG. 7 is illustrated for explaining the program information area 73 of FIG. 5. In this area, the application code 91 (one byte) is stored to identify a plurality of languages when program information consisting of a plurality of languages is stored in the program information area 73. Moreover, the character code 92 of one byte suggesting the characters used in the subsequent title 93, program information (title 93) of 28 bytes and alternative data 94 (nine bytes) and alternative data 95 (two bytes) which are displayed in place of the data to be intrinsically displayed when the data read by the information processing apparatus 1 cannot be displayed are also stored.

Figure 8:
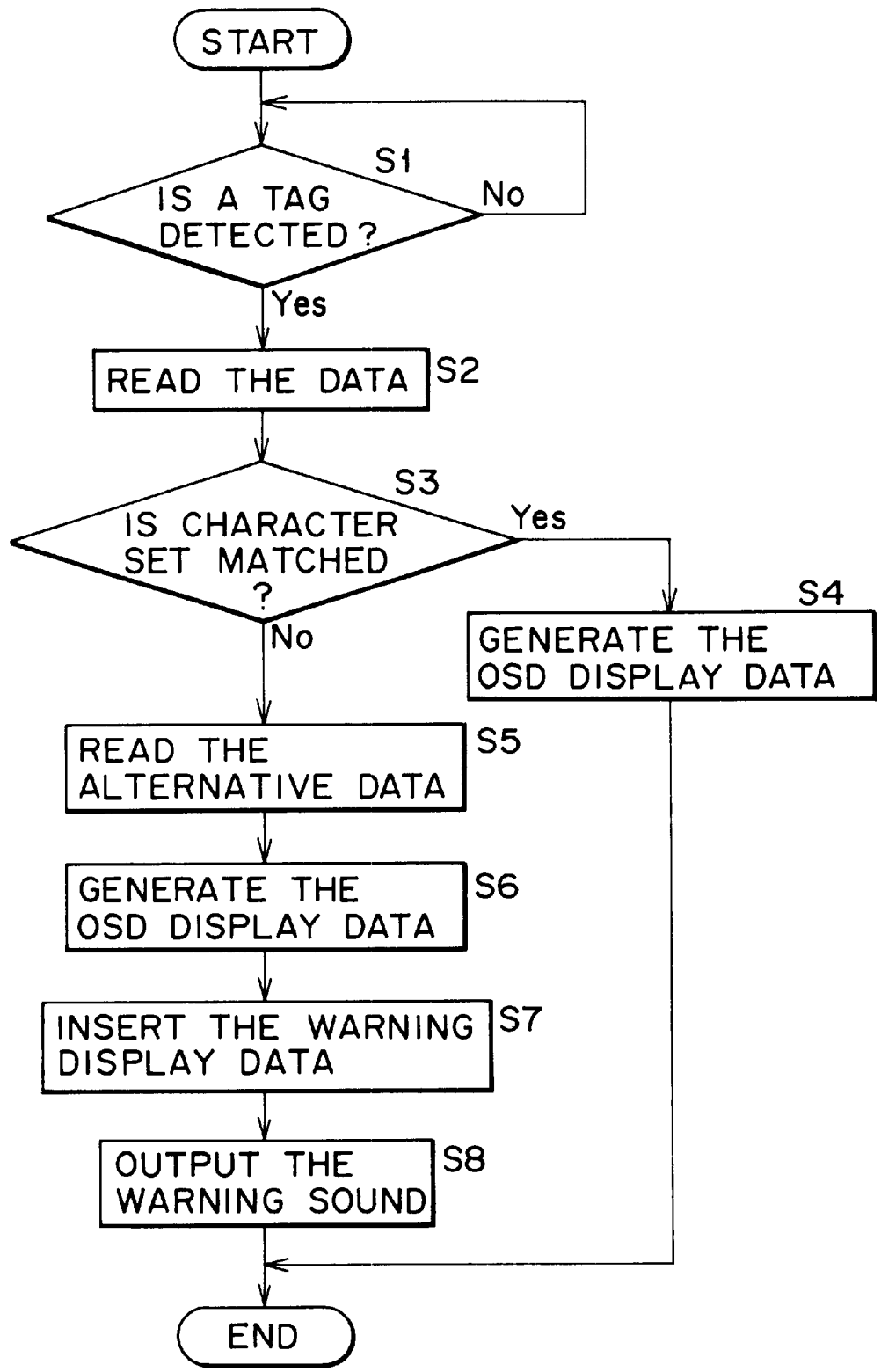
FIG. 8 is a flowchart for explaining operations of the information processing apparatus 1 of the present invention.

Next, operations of the information processing apparatus 1 of the present invention will be explained with reference to the flowchart of FIG. 8. FIG. 8 illustrates the process in which the tag 2 supports only one language. First, when a video cassette 61 on which a tag 2 is adhered is loaded or placed near in the predetermined distance to the information processing apparatus 1, the read writer 11 (microcomputer 45) judges, in the step S1, whether the tag 2 is detected or not. When the tag is judged not to be detected in the step S1, operation returns to the step S1. When the tag 2 is judged to be detected in the step S1, operation goes to the step S2.

In the step S2, the microcomputer 45 starts to read the data stored in the EEPROM 28 of tag 2. In the step S3, the microcomputer 45 reads the character set information intrinsic to the information processing apparatus 1 being stored in the ROM 46. The microcomputer 45 judges whether the character set information intrinsic to the information processing apparatus 1 is matched or not with the character set information stored as the character code 82.

When matching of the character set information is judged in the step S3, operation goes to the step S4 and the microcomputer 45 converts the title 83 and title 93 read from the tag 2 into the predetermined data and then supplies this data to the OSD section 13. The OSD section 13 generates the display image from the data supplied from the microcomputer 45 and causes the display section 14 to display the data, thereby completing the processing.

When the character set information is judged not to be matched in the step S3, operation goes to the step S5. Here, the microcomputer 45 reads the alternative data 81, 94 and 95 from the tag 2. Thereafter, operation goes to the step S6.

In the step S6, the microcomputer 45 converts the obtained alternative data 81, 94, 95 to the predetermined data and then supplies the converted data to the OSD section 13. The OSD section 13 generates a display image from the data supplied, causing the display section 14 to display the data.

In the step S7, the microcomputer 45 generates a warning display data to suggest that matching of the character set information stored in the information processing apparatus 1 and tag 2 cannot be attained and then supplies this warning display data to the OSD section 13. The OSD section 13 causes the display section 14 to additionally display the warning display data supplied to the display image.

In the step S8, the microcomputer 45 supplies the signal suggesting that the character set information is not matched to the warning sound generating section 15. When the signal suggesting that matching of character set information is not attained is supplied to the warning sound generating section 15, the warning sound generating section 15 generates the warning sound to output the warning sound through a speaker 15 and complete the processing.

Figure 9:
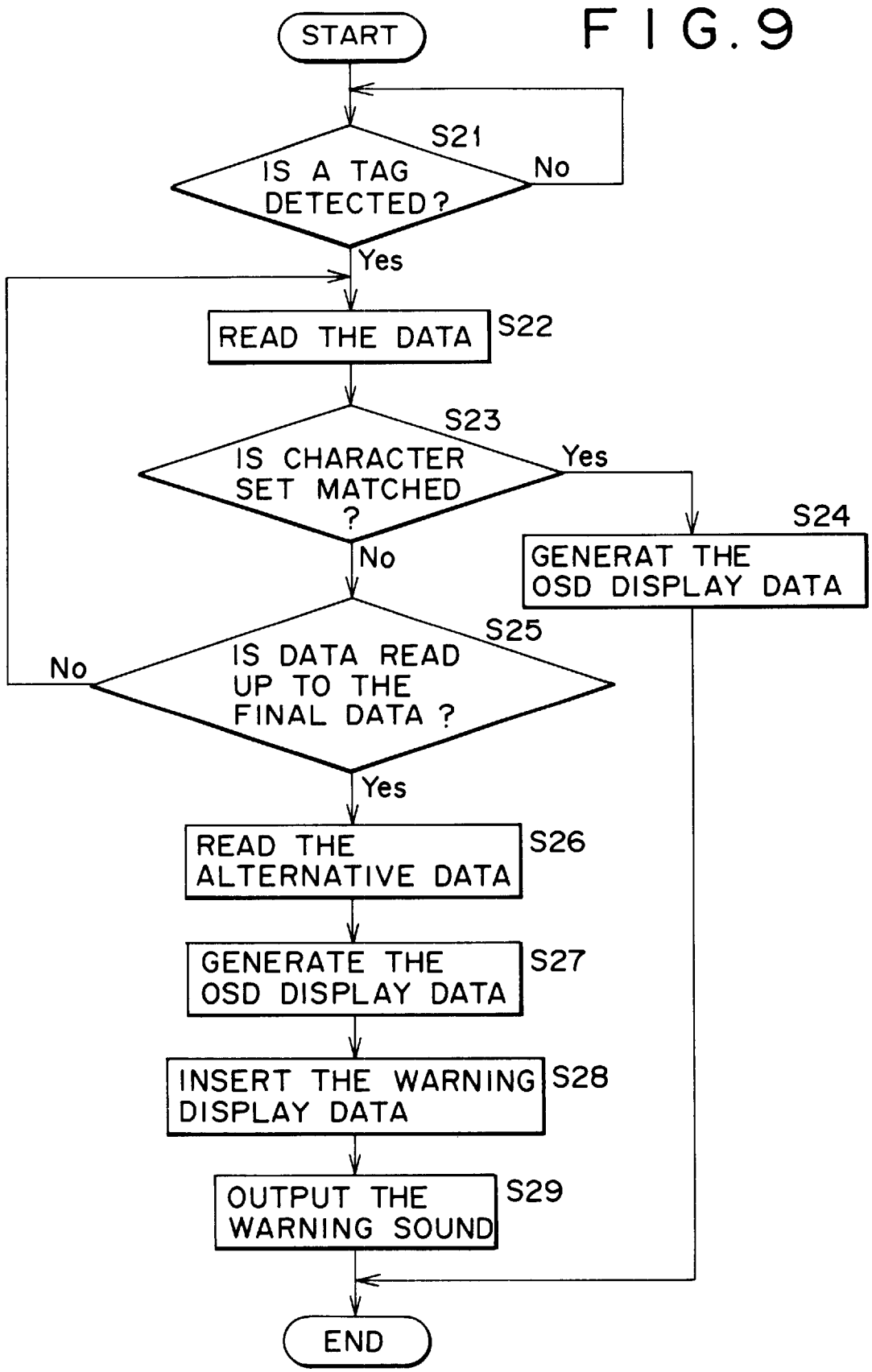
FIG. 9 is a flowchart for explaining different operations of the information processing apparatus 1 of the present invention.

Next, operations of the information processing apparatus 1 when the tag 2 supports a plurality of languages will be explained with reference to the flowchart of FIG. 9. The processes of the steps from S21 to S29 in FIG. 9 are basically similar to the processes of the steps from S1 to S8 of FIG. 8. Only difference from FIG. 8 is that the process of step S25 is inserted between the step S23 and step S26 (corresponding to the steps S3 and S5 of FIG. 8).

Namely, when it is judged the character set information is not matched in the step S23, operation goes to the step S25. Here, the microcomputer 45 judges whether the data stored in the tag 2 is read up to the final data or not. This judgment is performed by referring to the application code 91 storing a plurality of pieces of language information. When it is judged that the data is not yet read up to the final data in the step S25, operation returns to the step S22 (corresponding to the step S2 of FIG. 8) and the subsequent operations are repeated.

When it is judged that data is read up to the final data in the step S25, operation goes to the step S26 (corresponding to the step S5 of FIG. 8), the microcomputer 45 reads the alternative data 81, 94 and 95 from the tag 2. The processes of the steps from S27 to S29 to be executed subsequently are similar to those of the steps S6 to S8 of FIG. 8.

In this embodiment, data format of memory in the tag 2 is only an example and data format is not limited thereto.

In this specification, a distribution medium for offering the computer program to execute the processes explained above to users includes a transmission medium of network such as Internet and digital satellite, in addition to information recording medium such as magnetic disk and CD-ROM or the like.

What is claimed is:

1. Information processing apparatus accessible to a non-contact type storage device, comprising:

judging means for judging whether data being stored in said storage device can be displayed or not;

reading means for reading alternative data from said storage device when said data is judged not to be displayed by said judging means;

converting means for converting said alternative data read by said reading means to the data to be displayed; and display controlling means for making control to display the data converted by said converting means;

whereby said converted data is displayed together with an indication that alternative data is being displayed.

2. Information processing apparatus as claimed in claim 1, further comprising a warning sound generating means for generating a warning sound which suggests disabled data display when said data is judged not to be displayed by said judging means.

3. Information processing method of an information processing apparatus accessible to a non-contact type storage device, comprising:

judging step for judging whether data being stored in said storage device can be displayed or not;

reading step for reading alternative data from said storage device when said data is judged not to be displayed in said judging step;

converting step for converting said alternative data read in said reading step to the data to be displayed; and display controlling step for making control to display the data converted in said converting step;

whereby said converted data is displayed together with an indication that alternative data is being displayed.

4. Distribution medium providing a program for causing an information processing apparatus accessible to a non-contact type storage device to execute the processes including:

judging step for judging whether data being stored in said storage device can be displayed or not;

reading step for reading alternative data from said storage device when said data is judged not to be displayed by said judging step;

converting step for converting said alternative data read in said reading step to the data to be displayed; and display controlling step for making control to display the data converted in said converting step;

whereby said converted data is displayed together with an indication that alternative data is being displayed.

* * * * *